(No Model.)
H. S. HOY.
HAY RACK.
No. 481,175.  Patented Aug. 23, 1892.
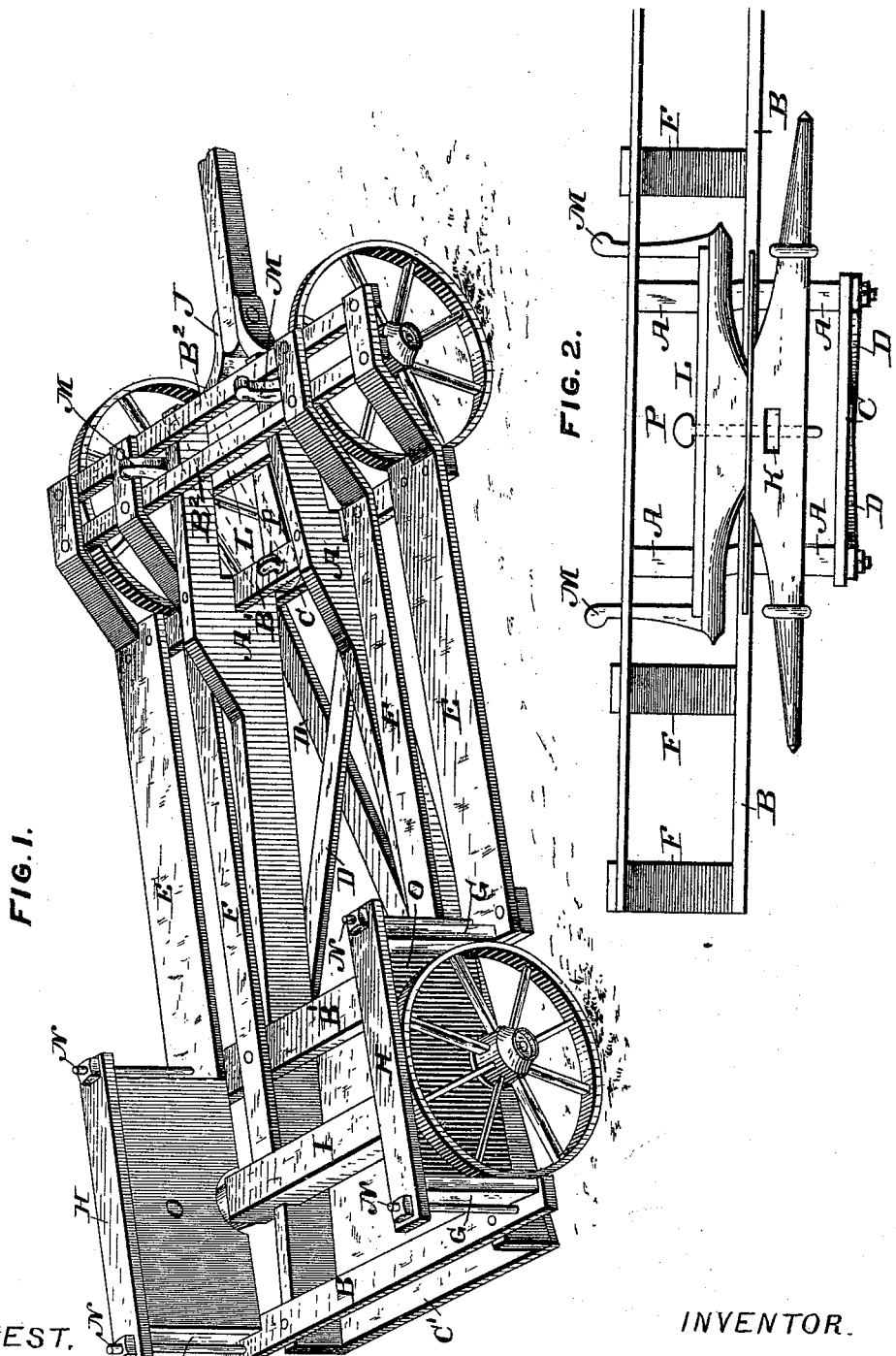
ATTEST.
J. Henry Kaiser
Joseph C. Stack
INVENTOR.
Henry S. Hoy
By Geo. B. Shepard
Attorney

UNITED STATES PATENT OFFICE.

HENRY S. HOY, OF LOUISVILLE, NEW YORK.

HAY-RACK.

SPECIFICATION forming part of Letters Patent No. 481,175, dated August 23, 1892.

Application filed May 8, 1891. Serial No. 392,001. (No model.)

*To all whom it may concern:*

Be it known that I, HENRY S. HOY, a citizen of the United States of America, and a resident of Louisville, in the county of St. Lawrence and State of New York, have invented certain new and useful Improvements in Hay-Racks; and I do hereby declare that the following is a full, clear, and exact description of the invention, which will enable others skilled in the art to which it appertains to make and use the same, reference being had to the accompanying drawings, which form a part of this specification, in which—

Figure 1 is a perspective view of my improved hay-rack mounted upon wheels and running-gear, as described below; and Fig. 2 is an end view of the forward part of the same in position on the wagon-bolster, the tongue and hounds of wagon being omitted the more clearly to show the method of securing my improved hay-rack in place upon the wagon.

Like letters of reference indicate corresponding parts throughout the two figures.

As heretofore constructed hay-racks were made to ride as high from the ground as the hay could be conveniently loaded for the purpose of the more easily pitching off the load onto the mow in the barn, which, as it became nearly full, would frequently reach twelve feet in height above the driveway upon which the wagon stood.

The improved method now adopted by most farmers of unloading hay from the rack by means of a horse hay-fork and tackle has obviated the necessity formerly existing of having a high rack.

The object therefore of my invention is to hang the hay-rack as near the ground as possible, make it light, strong, and simple in construction, so that it may be easily repaired with material and tools in common use, and also to employ for the support thereof the wheels and forward running-gear of the ordinary farm-wagon, thereby saving expense of a special running-gear for this purpose. I therefore make the supporting-framework of my improved hay-rack of two planks A A, placed longitudinally and set upon edge and securely bolted under the axle-tree I by means of screw-bolts passing vertically down through the axle-tree and each plank and secured at their lower ends by nuts in the ordinary manner, the axle-tree being gained into each plank about two inches where it crosses the same. These planks A A are set converging toward their forward ends and are cut with a vertical offset of about ten inches some four feet and two inches from their forward ends, thus raising their forward ends sufficiently to rest upon the forward bolster of the ordinary farm-wagon, while the main frame of the rack hangs level when the hind wheels of the same wagon are placed upon the axles at each end of the axle-tree I. I then rigidly connect the two longitudinal planks A A with each other by means of cross-bars B B' B' B² B², all securely fastened to said plank A A by means of ordinary bolts and nuts, the two middle cross-bars B' B' being gained into the said planks, so as to render their upper surfaces level with the upper edges of the lower part of said planks, as shown, and the two forward cross-bars and the hind cross-bar rest upon the upper edges of said planks where they cross the same. These cross-bars, except the forward middle one B', which is six inches wide, are all about four inches wide by two inches thick and seven or eight feet long. Upon these cross-bars I bolt the longitudinal boards E E and F F, the boards E E terminating rearwardly on the hind cross-bar B' and the boards F F terminating rearwardly against the axle-tree I, the forward ends of such boards being carried forward over and securely bolted to the two forward cross-bars, the joints of the boards being so sawed that in each instance the part carrying the bolt laps over and holds in place between it and the cross-bar the other part. More than the number of these boards may be used than shown in Fig. 1, or three on a side, according to the width of the rack, which may be made of any desirable width or length, and boards may also be fastened between the forward ends of the planks A A, if desired, as shown by the dotted lines.

Under the lower edge of the planks A A are placed two cross-bars, one shown at C and the other being concealed by the rear cross-bar B', and below them I again place two diagonal brace-bars D D, all being securely fastened in place by the bolts fastening also the upper cross-bars B' B', as described. I also fasten a rear lower cross-bar C' on the under side of the planks A A at their rear ends for the purpose of affording support to the bottom boards of said hay-rack, (not shown,) but laid loosely thereon when in use.

For hind-wheel guards I construct the two boxes O O by using two by four inch planks about twenty-seven inches long for end pieces, pieces of board one inch by five inches and about five feet long for top pieces, and inch boarding for backs securely nailed together, as shown, with each end of the top pieces projecting over the end pieces about three inches, and an aperture being sawed at the lower back of the boxes to permit the hub of the wheel to slip over the axle upon I. I then place the boxes upright, as shown, upon the upper rear cross-bars B and B' and pass the screw-bolts N N down through the said block and projecting end pieces, and through the cross-bars B and B', as shown, and hold them securely in place by means of nuts screwed upon their lower ends.

On the under edge of the upper offset of the planks A A and just beneath the front edge of the cross-bar $B^2$, I fasten a secondary cross-bar L, having a hole through its center to receive the king-bolt P, Fig. 2, and notches at both ends to grasp the bolster-stakes M M, as shown at Fig. 2, and hold them about six inches outside of the converging planks A A, so that, as ordinarily constructed, the spool of the hounds on the running-gear of a farm-wagon in cramping will strike the reach before the wheel strikes either plank A A. I then fasten a short reach K by a single bolt to the under side of the forward cross-bar B', the said reach being provided with a hole to receive the king-bolt P, Fig. 2.

In using my improved hay-rack I first raise the rear end thereof and secure the hind wheels of an ordinary farm-wagon upon the axle-tree I in the usual manner of securing wheels to farm-wagons. I then raise the forward end of my said rack and place thereunder the forward wheels and running-gear of an ordinary farm-wagon with the reach removed. I then slip the short reach K in position of the removed reach and drop the notched cross-bar L between the bolster-stakes M M. I then fasten together the notched cross-bar L, bolster, axle-tree, and reach K by slipping the king-bolt P through the holes therein in the usual manner of fastening together the forward running-gear of farm-wagons, and fasten a standard to the forward end of the rack in the usual manner of so doing, and my said improved hay-rack is then ready for loading.

The hind axle-tree of my improved hay-rack may be made of any length desired, though I prefer to make it eight feet long, as thereby it insures more steadiness to the load.

It is obvious that being hung low, as described, my improved hay-rack can be loaded in the field much more easily and expeditiously than the ordinary hay-rack, as each fork full of hay will need to be lifted less in height, and that my improved hay-rack will be very difficult to overturn even with a high load, while the hay can be removed with a horse fork and tackle quite as readily as from the ordinary hay-rack.

In storing my improved hay-rack the wheel-guards O O can be removed therefrom by removing the bolts N N N N, so that the rack will occupy less storage-space.

Having described my improved hay-rack and the manner of constructing and operating the same, what I claim as my invention, and desire to secure by Letters Patent of the United States, is—

1. In a hay-rack having the rear axles placed above the longitudinal frame-timbers of said rack and the forward end of said rack adapted to fit over and be used with the forward running-gear of an ordinary farm-wagon, the combination of converging framing-planks having a vertical offset near the forward end of each, cross-bars fastening in position said framing-planks, longitudinal boarding for supporting the load, and a short reach for attaching the framework to the axle.

2. In a hay-rack, the combination of the converging framing-planks A A, having a vertical offset near the forward end of each, the upper cross-bars B B' B' $B^2$ $B^2$, and the lower cross-bars C C C', the axle-tree I, hung over the framing-planks A A, as shown, the braces D D, the longitudinal boarding E E E E, the short reach K, and the wheel-guards O O, all arranged substantially as shown and described.

HENRY S. HOY.

Witnesses:
 CHAS. G. IDLER,
 THOMAS J. HOUSTON.